(12) United States Patent
Benosman et al.

(10) Patent No.: US 11,513,484 B2
(45) Date of Patent: Nov. 29, 2022

(54) SYSTEM FOR CONTINUOUS-TIME OPTIMIZATION WITH PRE-DEFINED FINITE-TIME CONVERGENCE

(71) Applicant: Mitsubishi Electric Research Laboratories, Inc., Cambridge, MA (US)

(72) Inventors: Mouhacine Benosman, Boston, MA (US); Orlando Romero, Troy, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 287 days.

(21) Appl. No.: 16/666,095

(22) Filed: Oct. 28, 2019

(65) Prior Publication Data
US 2021/0124321 A1    Apr. 29, 2021

(51) Int. Cl.
    *G05B 17/02*      (2006.01)
    *G06F 17/13*      (2006.01)

(52) U.S. Cl.
     CPC ............. *G05B 17/02* (2013.01); *G06F 17/13* (2013.01)

(58) Field of Classification Search
     CPC ....... G05B 17/02; G05B 13/021; G06F 17/13; G06F 17/11
     See application file for complete search history.

(56) References Cited

U.S. PATENT DOCUMENTS

| | | |
|---|---|---|
| 8,006,220 B2 | 8/2011 | McConaghy et al. |
| 2014/0214373 A1 | 7/2014 | Jardin et al. |
| 2019/0188236 A1 | 6/2019 | Horesh et al. |

OTHER PUBLICATIONS

Paden et al. "A Calculus for Computing Filippov's differential inclusion with application to the variable structure control of robot maniuplators." 1986 IEEE Conference on Deciaion and Control. Dec. 1986, pp. 578-582.
Orlando et al., "Finite Time Convergence Algorithms via Differential Inclusions," ARXIV.org. Cornell University Library, Ithaca, NY. Dec. 18, 2019.

*Primary Examiner* — Tejal Gami
(74) *Attorney, Agent, or Firm* — Gennadiy Vinokur; Hironori Tsukamoto (57) ABSTRACT

A controller for controlling a system is provided. The controller performs measuring variables via an interface to generate a vector of variables, providing a cost function, with respect to the system, based on the vector variables using weighting factors, wherein the vector variables are represented by a time-step, computing first-derivative of the cost function at an initial time-step, obtaining a convergence time from the first-derivative of the cost function, computing second derivative of the cost function and generating an optimization differential equation based on the first and second derivatives of the cost function, proceeding, starting with the initial time-step, to obtain a value of the optimization differential equation by solving the optimization differential equation, in an iteration manner, with a predetermined time step being multiplied with the value of the solved differential equation to obtain next vector variables corresponding to a next iteration time-step, until the time-step reaches the convergence time, and outputting optimal values of the vector of variables and the cost function.

7 Claims, 12 Drawing Sheets

SYSTEM FOR CONTINUOUS-TIME OPTIMIZATION WITH PRE-DEFINED FINITE-TIME CONVERGENCE

FIELD OF THE INVENTION

The present invention relates generally to a system for optimization algorithms, more specifically, it relates to a system and method for optimization algorithms designed based on dynamical systems theory.

BACKGROUND OF THE INVENTION

Optimization algorithms are needed in many real-life applications, from elevator scheduling applications to robotics and artificial intelligence applications. Hence, there is always a need for faster and more reliable optimization algorithms. One way to accelerate these optimization algorithms is to design them such that they achieve convergence to an optimum in a desired finite time. This is one of the goals of this invention.

SUMMARY OF THE INVENTION

Some embodiments of the present invention provide some ideas from Lyapunov-based finite-time state control, to design a new family of discontinuous flows, which ensure a desired finite-time convergence to the invariant set containing a unique local optima. Furthermore, due to the discontinuous nature of the proposed flows, we propose to extend one of the existing Lyapunov-based inequality condition for finite-time convergence of continuous-time dynamical systems, to the case of differential inclusions. Some embodiments of the present invention provides a robustification of these flows with respect to bounded additive uncertainties. We propose an extension to the case of time-varying cost functions. Finally, we extend part of the results to the case of constrained optimization, by using some recent results from barrier Lyapunov functions control theory.

Some embodiments of the present invention are based on recognition that a controller for controlling a system collects/measures a set of variables to determine the set of vector variables. A cost function may be determined using vector variables and some weighting factors. The vector variables can be represented as a function of a time-step. The cost function further goes under two-order derivative flows for obtaining an optimization differential equation, where the optimization differential equation is solved in an iterative fashion until a convergence time is reached.

According to some embodiments of the present invention, a controller for controlling a system is provided. The controller includes an interface configured to receive measurement signals from sensor units and output control signals to the system to be controlled; a memory to store computer-executable algorithms including variable measuring algorithm, cost function equations, ordinary differential equation (ODE) and ordinary differential inclusion (ODI) solving algorithms and Optimal variables' values output algorithm; a processor, in connection with the memory, configured to perform steps of receiving measuring variables via the interface to generate a vector of variables; providing a cost function equation, with respect to the system, based on the vector variables using weighting factors, wherein the vector variables are represented by a time-step; computing first-derivative of the cost function at an initial time-step; obtaining a convergence time from the first-derivative of the cost function; computing second derivative of the cost function and generating an optimization differential equation based on the first and second derivatives of the cost function; proceeding, starting with the initial time-step, to obtain a value of the optimization differential equation or differential inclusion by solving the optimization differential equation or the differential inclusion, in an iteration manner, with a predetermined time step being multiplied with the value of the solved differential equation to obtain next vector variables corresponding to a next iteration time-step, until the time-step reaches the convergence time; and outputting optimal values of the vector of variables and the cost function.

Further, some embodiments of the present invention are based on recognition that a computer-implemented method for controlling a system includes measuring variables via an interface to generate a vector of variables; providing a cost function, with respect to the system, based on the vector variables using weighting factors, wherein the vector variables are represented by a time-step; computing first-derivative of the cost function at an initial time-step; obtaining a convergence time from the first-derivative of the cost function; computing second derivative of the cost function and generating an optimization differential equation based on the first and second derivatives of the cost function; proceeding, starting with the initial time-step, to obtain a value of the optimization differential equation or differential inclusion by solving the optimization differential equation or the differential inclusion, in an iteration manner, with a predetermined time step being multiplied with the value of the solved differential equation to obtain next vector variables corresponding to a next iteration time-step, until the time-step reaches the convergence time; and outputting optimal values of the vector of variables and the cost function.

According to the present invention, it becomes possible to compute exact conversion times for real-time applications, which provide simple implementations with compact computation programs. This allows a controller/system to solve time-varying cost functions, and can realize robust system controllers/computer-implemented control method. Further, the system controllers/computer-implemented control method can reduce the computation load resulting low-power computation, and make systems possible to realize the real-time control.

BRIEF DESCRIPTION OF THE DRAWINGS

The accompanying drawings, which are included to provide a further understanding of the invention, illustrate embodiments of the invention and together with the description serve to explain the principle of the invention.

Throughout the drawings and the detailed description, unless otherwise described, the same drawing reference numerals will be understood to refer to the same or like elements, features, and structures. The relative size and depiction of these elements may be exaggerated for clarity, illustration, and convenience.

DETAILED DESCRIPTION OF THE PREFERRED EMBODIMENTS

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

Figure 1:
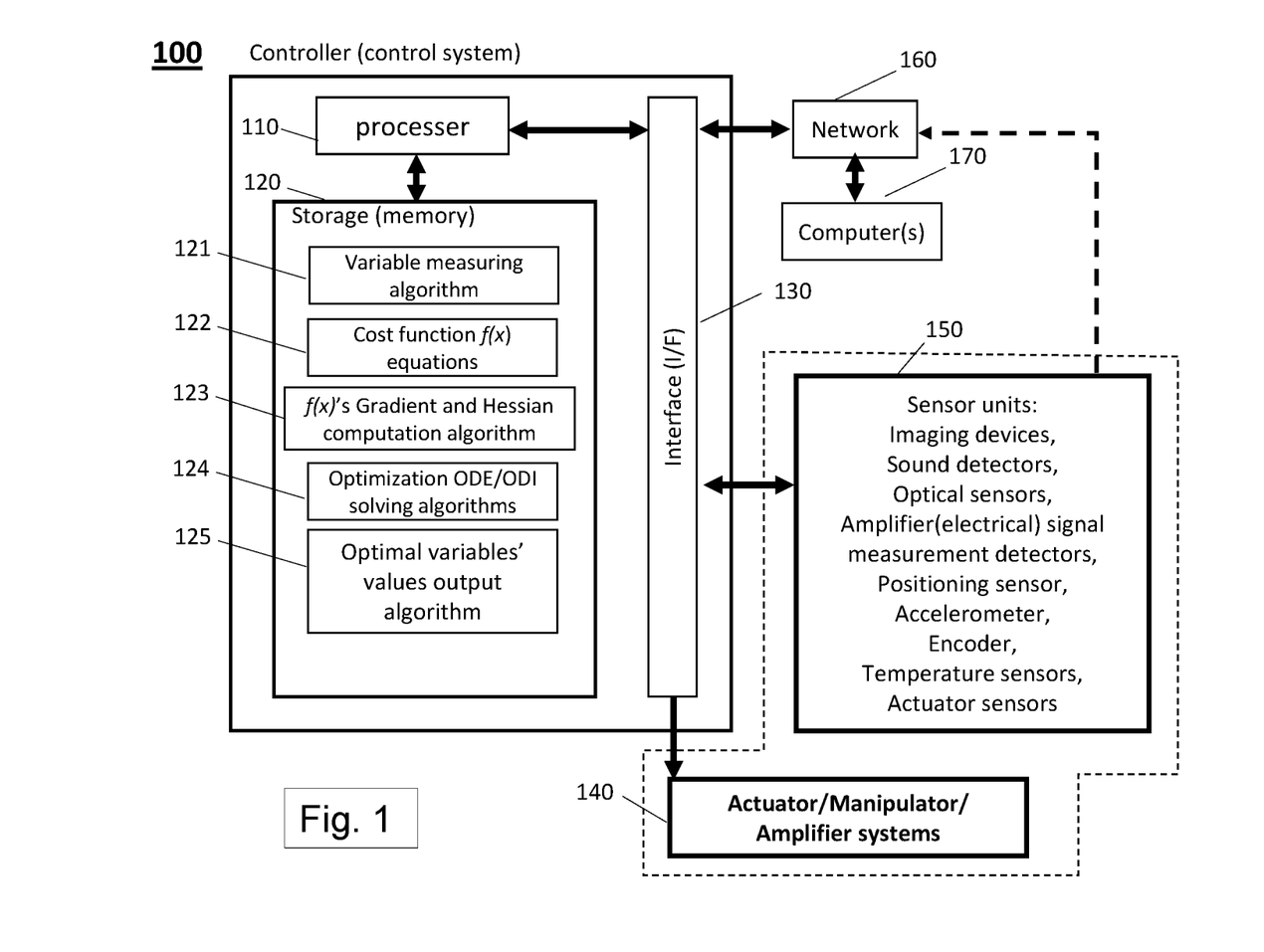
FIG. 1 is a schematic diagram illustrating a system for optimizing a cost function according to embodiments of the present invention.

FIG. 1 is a schematic diagram illustrating a controller (control system) 100 for controlling a system. The controller 100 includes a processor 110, an interface (I/F) 130 configured to receive signals from sensor units 150 and output commands or signals to a system 140 to be controlled by the controller 100. The I/F 130 is configured to communicate with computers 170 via a network 160 for transmitting states of the controller 100 and the systems 140 and receiving requests, commands, or programs to be used in the controller 100.

The I/F 130 is also configured to receive signals or data from the sensor units 150. The sensor units 150 may include imaging devices, sound detectors, optical sensors, electrical signal measurement detectors for measuring signals of amplifiers (power amplifiers), positioning sensors For instance, the system 140 may be Heating, Ventilation, and Air Conditioning (HVAC) system operating actuators/fans for controlling temperatures in rooms in a building/house. The controller 100 also includes a memory (storage) 120, in connection with the memory 120, storing computer-executable algorithms including variable measuring algorithm 121 that is configured to convert the signals (measurement data) from the sensor units 150 into a variable vector with respect to the system 140 to be controlled by the controller 100, e.g. actuators of an HVAC system, manipulators of a robotic system, or measurement signals of a power amplifier system. Further, the computer-executable algorithms in the memory 120 include cost function $f(x)$ equations 122 for optimizing cost function $f(x)$, where $f$ represents the cost function and x the variables of the cost function, also called optimization variables to be stored in the memory (storage) 120.

The sensor units 150 are arranged to control the system 140 and configured to transmit signals to the controller 100 in which the signals are used by the variable measuring algorithm to output the optimization variables x. These variables are used to compute a value for the cost function $f$ 122 corresponding to the variables. In some cases, the variable measuring algorithm may select an appropriate cost function equation from the cost function equations 122 that corresponds to the signals transmitted to the sensor units 150 with respect to the system 140. Further, in some cases, a predetermined cost function may be stored for a predetermined system 140.

The memory 120 also includes gradient/Hassian computation algorithm 123 and optimization ordinary differential equation (ODE) or ordinary differential inclusion (ODI) solving algorithm 124 is then solved result (data) is stored in 124 to obtain the optimal values of the optimization variables 125 to be stored in the memory 120.

In some cases, the controller 100 may be remotely controlled from the computer(s) 170 via the network 160 by receiving control commands from the computer(s) 170.

In this previous description the main and novel part is the ODE or ODI part which when solved in time leads to the optimal values of the optimization variables in a desired finite-time.

We present now how can we design such ODE or ODI using control theory and dynamical systems theory. Consider some objective cost function $f: R^n \to R$ that we wish to minimize. In particular, let $x^a \in R^n$ be an arbitrary local minimum of $f$ that is unknown to us. In continuous-time optimization, we typically proceed by designing a nonlinear state-space dynamical system $$\dot{x} = F(x) \qquad (1)$$

or a time-varying one replacing F(x) with F(t,x), for which F(x) can be computed without explicit knowledge of $x^a$ and for which (1) is certifiably asymptotically stable at $x^a$. Ideally, computing F(x) should be possible using only up to second-order information on $f$.

In this work, however, we seek dynamical systems for which (1) is certifiably finite-time stable at $x^a$. As will be clear later, such systems need to be possibly discontinuous or non-Lipschitz, based on differential inclusions ODIs instead of ODEs. Our approach to achieve this objective is largely based on exploiting the Lyapunov-like differential inequality $$\dot{E}(t) \leq -cE(t)^\alpha, a.e. t \geq 0, \qquad (2)$$

with constants $c>0$ and $\alpha<1$, for absolutely continuous functions E such that $E(0)>0$. Indeed, under the aforementioned conditions, $E(t) \to 0$ will be reached in finite time $$t \to t^a \leq \frac{E(0)^{1-\alpha}}{c(1-\alpha)} < \infty.$$

We will therefore achieve (local and strong) finite-time stability, and thus finite-time convergence.

A Family of Finite-Time Stable, Second-Order Optimization ODEs/ODIs

We now propose a family of second-order optimization methods with finite-time convergence constructed using two gradient-based Lyapunov functions, namely $E=V(x)=\|\nabla f(x)\|^2$ and $E=V(x)=\|\nabla f(x)\|_1$. First, we need to assume sufficient smoothness on the cost function.

Assumption 1 $f:\mathbb{R}^n \to \mathbb{R}$ is twice continuously differentiable and strongly convex in an open neighborhood $D \subseteq \mathbb{R}^n$ of a stationary point $x^{\mathring{a}} \in \mathbb{R}^n$.

Since $\nabla V(x) = 2\nabla^2 f(x)\nabla f(x)$ for $V(x)=\|\nabla f(x)\|^2$ and $\nabla V(x) = \nabla^2 f(x) \text{sign}(\nabla f(x))$ a.e. for $V(x)=\|\nabla f(x)\|_1$, we can readily design Filippov differential inclusions that are finite-time stable at $x^{\mathring{a}}$. In particular, we may design such differential inclusions to achieve an exact and prescribed finite settling time, at the trade-off of requiring second-order information on $f$.

Figure 2:
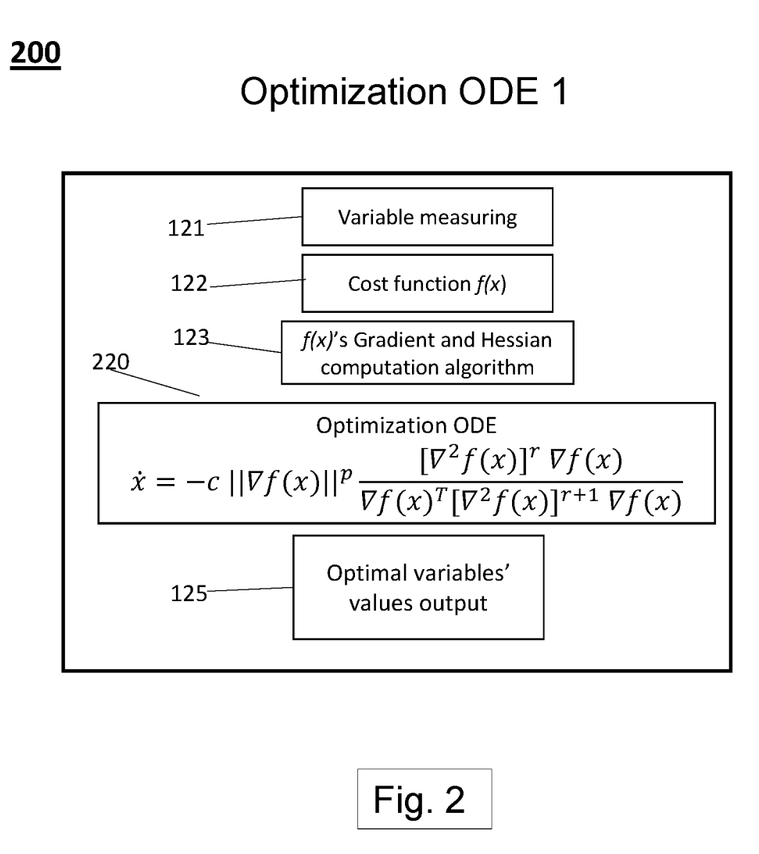
FIG. 2 is a schematic diagram illustrating a system for optimizing a cost function according to embodiments of the present invention, using a proposed optimization ODE.
Figure 3:
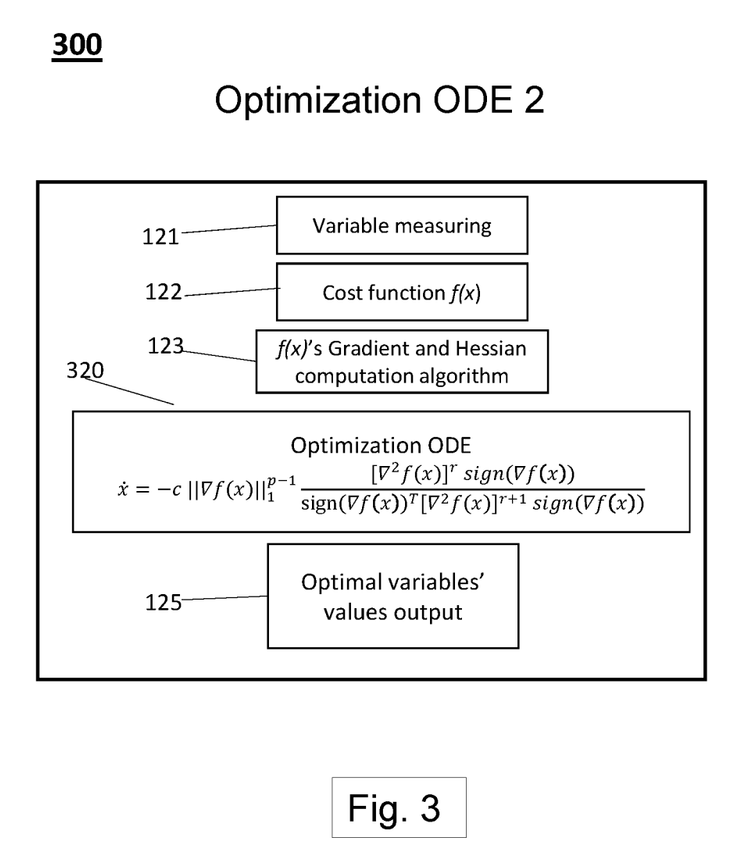
FIG. 3 is a schematic diagram illustrating a system for optimizing a cost function according to embodiments of the present invention, using a proposed optimization ODE.

Let $c>0$, $p \in [1,2)$, and. Under Assumption 1, any maximal Filippov solution to the discontinuous second-order g $r \in \mathbb{R}$ generalized Newton-like optimization ODE 220

$$\dot{x} = -c\|\nabla f(x)\|^p \frac{[\nabla^2 f(x)]^r \nabla f(x)}{\nabla f(x)^T [\nabla^2 f(x)]^{r+1} \nabla f(x)} \quad (3)$$

and optimization ODI 320

$$\dot{x} = -c\|\nabla f(x)\|_1^{p-1} \frac{[\nabla^2 f(x)]^r \text{sign}(\nabla f(x))}{\text{sign}(\nabla f(x))^T [\nabla^2 f(x)]^{r+1} \text{sign}(\nabla f(x))} \quad (4)$$

(where $x_0 = x(0)$) will converge in finite time to $x^{\mathring{a}}$. Furthermore, their convergence times are given exactly by $$t^* = \frac{\|\nabla f(x0)\|^{2-p}}{c(2-p)}, \text{ or } t^* = \frac{\|\nabla f(x0)\|_1^p}{cp}, \quad (5)$$

for (3)-(4), respectively, where $x_0 = x(0)$. In particular, given any compact and positively invariant subset $S \subset D$, both flows converge in finite with the aforementioned settling time upper bounds (which can be tightened by replacing $\overline{D}$ with S) for any $x_0 \in S$. Furthermore, if $D = \mathbb{R}^n$, then we have global finite-time convergnece, i.e. finite-time convergence to any maximal Filippov solution $x(\cdot)$ with arbitrary $x_0 = x(0) \in \mathbb{R}^n$.

To explain the previous mathematical statement in words, we can say that in one embodiment we propose the optimization ODE given by equation 220

$$\dot{x} = -c\|\nabla f(x)\|^p \frac{[\nabla^2 f(x)]^r \nabla f(x)}{\nabla f(x)^T [\nabla^2 f(x)]^{r+1} \nabla f(x)}$$

$c>0$, $p \in \mathbb{R}$, $[1,2)$, and $r \in \mathbb{R}$, which will converge to the optimum in a finite time $$t^* = \frac{\|\nabla f(x0)\|^{2-p}}{c(2-p)}.$$

In another embodiment we propose the ODI 320

$$\dot{x} = -c\|\nabla f(x)\|_1^{p-1} \frac{[\nabla^2 f(x)]^r \text{sign}(\nabla f(x))}{\text{sign}(\nabla f(x))^T [\nabla^2 f(x)]^{r+1} \text{sign}(\nabla f(x))}$$

$c>0$, $p \in [1,2)$, and $r \in \mathbb{R}$, which will converge to the optimum in a finite time $$t^* = \frac{\|\nabla f(x0)\|_1^p}{cp}.$$

This invention can be applied to many systems (controllers). For instance, vectors used in the following example systems can be obtained by the variable measuring algorithm 121 by receiving signals/data from the sensor units 150 arranged with respect to the system 140 via the I/F 130 or via the network 160.

For example, we can consider a robotics application where we want to control a robotic arm manipulator end effector to move from one initial position to another final position, with a desired initial velocity and a desired final velocity. Then, in this case the cost function $f(x)$ can we written as $f(x) = (\text{effector}_x(\theta) - x^*)^2 + (\text{effector}_y(\theta) - y^*)^2 + (V\text{effector}_x(\dot{\theta}) - Vx^*)^2 + (V\text{effector}_y(\dot{\theta}) - Vy^*)^2$, Where $x$ is defined as $x = (\theta, \dot{\theta})^T$, Where $\theta \in \mathbb{R}^n$ represents the vector of the robot manipulator arm articulation angles, and $\dot{\theta} \in \mathbb{R}^n$ represents the vector of the robot manipulator arm articulation angular velocities. effector$_x(\theta)$, effector$_y(\theta)$ represent the x-y position of the robotic arm end effector in a planar work frame, and are defined as function of the vector of the robot manipulator arm articulation angles $\theta \in \mathbb{R}^n$, as (effector$_x(\theta)$, effector$_y(\theta)$) = forward_geometric($\theta$), Where forward_geometric represents the forward kinematic model of the robotic manipulator arm. Veffector$_x(\dot{\theta})$, Veffector$_y(\dot{\theta})$ represent the Vx-Vy velocity of the robotic arm end effector in a planar work frame, and are defined as function of the vector of the robot manipulator arm articulation angular velocities $\dot{\theta} \in \mathbb{R}^n$, as (Veffector$_x(\dot{\theta})$, Veffector$_y(\dot{\theta})$) = forward_kinematic($\dot{\theta}$), Where forward_kinematic represents the forward kinematic model of the robotic manipulator arm. Finally, $x^*$, $y^*$ represent the desired x-y position of the robotic arm end effector in a planar work frame, and $Vx^*$, $Vy^*$ represent the desired Vx-Vy velocity of the robotic arm end effector in a planar work frame.

We can then use the optimization algorithm given by equation 220 or given by ODI 320 to find the series of points $x(t) = (\theta(t), \dot{\theta}(t))^T$ at successive time instants t from a given initial angular configuration of the robotic manipulator arm $x(0) = (\theta(0), \dot{\theta}(0))^T$ to the desired optimal configuration of the robotic manipulator arm $x(t^*) = x^{\mathring{a}} = (\theta(t^*), \dot{\theta}(t^*))^T$. These series of points are then send to the local low level joint PID controllers that regulate the robot manipulator arm to the successive series of points, leading the robot manipulator arm end effector from a given initial position to the desired final position.

For example, in another application related to a power amplifier system, where the cost function can be selected as $Q(\theta) = \text{Gain [dB]} + \text{OPAE [\%]} + \text{Pout [dBm]} + \text{ACPR [dBc]}$ Where Gain is the Gain of the amplifier in dB, PAE is the Power Added Efficiency in %, Pout is the Power output of the amplifier in dBm, ACPR is the Adjacent Channel Power in dBc. Then, the updates rule to find the optimal vector x* are based on model-free optimization algorithms, where x is a vector of the amplifier tuning parameters defined as $$x=[\text{Gate–bias}_{main}, \text{Gait–bias}_{peak}, \text{Power distribution, Phase difference}].$$

Yet in another system example, we can consider HVAC systems, where the goal is to set the indoor room temperature to a desired temperature setpoint T*, and to a desired airflow velocity setpoint V*. To do so, we can select the following cost function for this system $$f(x)=(T(x)-T^*)^2+(V(x)-V^*)^2,$$

Where, T(x), V(x), represent the room temperature and air flow velocity, respectively. The optimization variable vector x is defined in this case as $$x=(\text{inlet\_air}_{temperature}, \text{inlet\_air}_{velocity}),$$

where the inlet_air$_{temperature}$, inlet_air$_{velocity}$, represent the temperature and the velocity of the air flow coining out of the HVAC inlet in the room, which are directly controlled by the HVAC unit's lower level controller signals, such as, condenser fan control, compressor control, expansion valve control, and evaporator fan control.

As we explained earlier in the summary of this invention, we can also extend the results to solve optimization problem with time varying cost functions $$f(t,x), t \in R, x \in R^n$$

Figure 4:
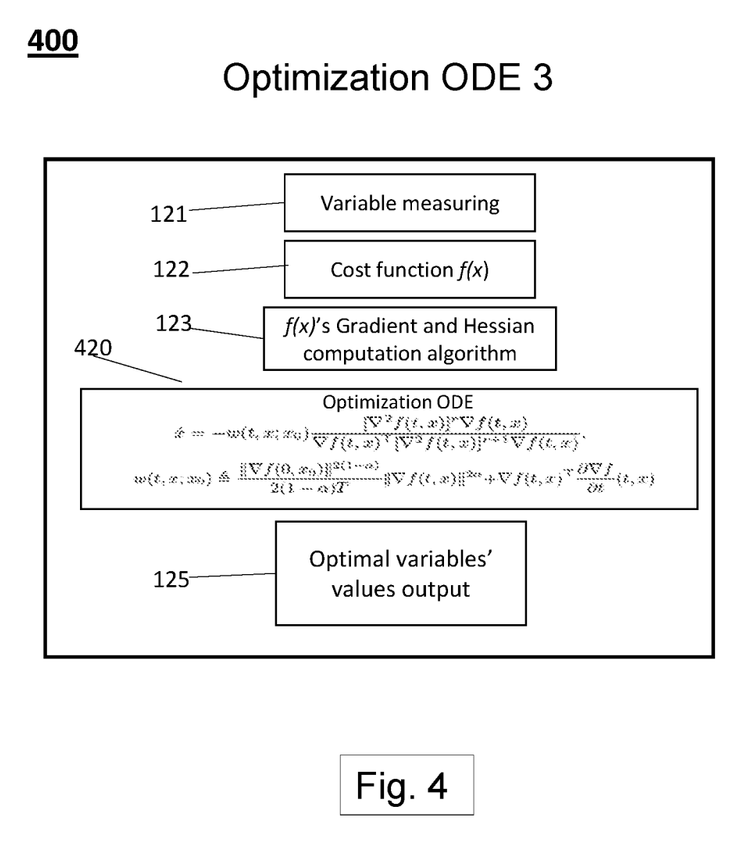
FIG. 4 is a schematic diagram illustrating a system for optimizing a cost function according to embodiments of the present invention, using a proposed optimization ODE.

We propose to use the following optimization ODE 420

$$\dot{x} = -w(t, x; x_0) \frac{[\nabla^2 f(t, x)]^T \nabla f(t,x)}{\nabla f(t, x)^T [\nabla^2 f(t, x)]^{r+1} \nabla f(t, x)},$$

$$w(t, x; x_0) \triangleq \frac{\|\nabla f(0, x_0)\|^{2(1-\alpha)}}{2(1-\alpha)T} \|\nabla f(t, x)\|^{2\alpha} + \nabla f(t, x)^T \frac{\partial \nabla f}{\partial t}(t, x)$$

$r \in R$, and $\alpha E \in [0.5, 1)$.

Figure 5:
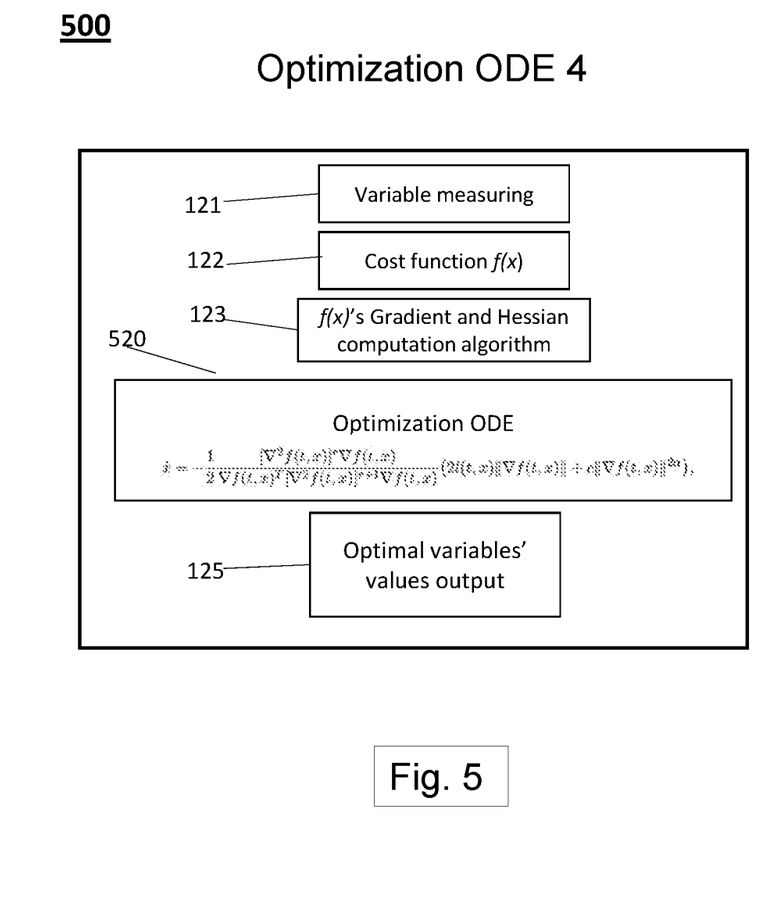
FIG. 5 is a schematic diagram illustrating a system for optimizing a cost function according to embodiments of the present invention, using a proposed optimization ODE.

Furthermore, if we cannot compute beforehand the term $$\nabla f(t, x)^T \frac{\partial \nabla f}{\partial t}(t, x)$$

then, in another embodiment of this invention, we figured out that we could use a more lose information about an upper-bound of this term, as follows: if we can have the upper-bound $$\left\| \frac{\partial}{\partial t} [\nabla f(t, x)] \right\| \leq l(t, x),$$

Where $l: \mathbb{R}_+ \times \mathbb{R}^n \to \mathbb{R} \times \mathbb{R}^n \mathbb{R}_+$, then we propose the following optimization ODE 520

$$\dot{x} = \frac{1}{2} \frac{[\nabla^2 f(t,x)]^T \nabla f(t,x)}{\nabla f(t, x)^T [\nabla^2 f(t, x)]^{r+1} \nabla f(t, x)} (2l(t, x) \|\nabla f(t, x)\| + c \|\nabla f(t, x)\|^{2\alpha}),$$

where c>0, r∈R, and α∈[0.5,1).

Discretization of the Optimization ODEs/ODIs

To be able to implement in a computer, the proposed optimization ODEs and ODIs, we need to discretizing them. There are many discretization methods that can be applied to solve our optimization ODEs and ODIs.

Figure 6:
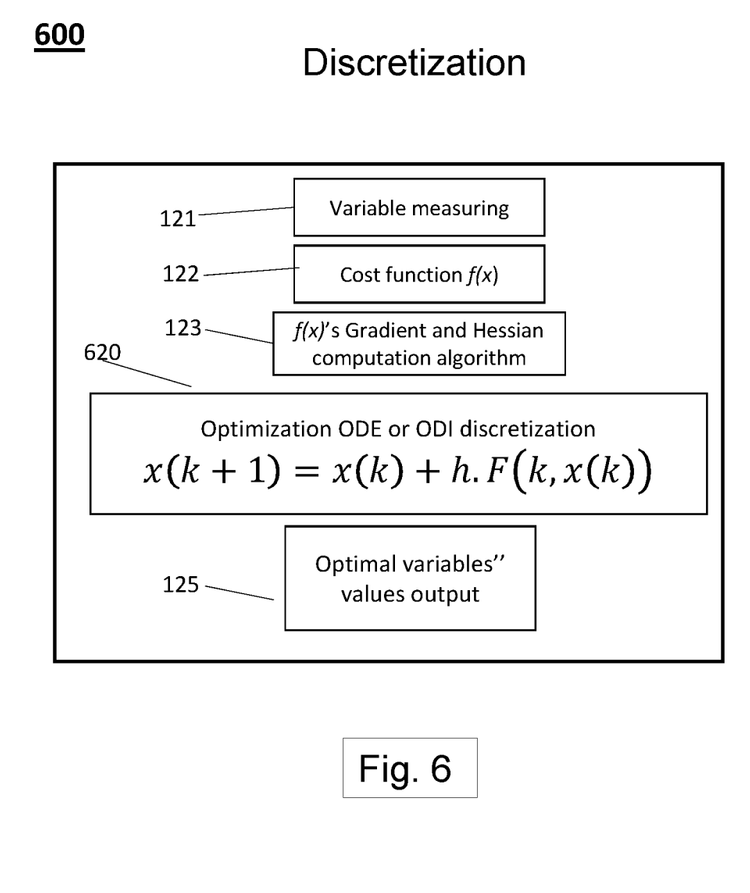
FIG. 6 is a schematic diagram illustrating a system for optimizing a cost function according to embodiments of the present invention, using an ODE or ODI discretization.

For example, in one embodiment, we propose to use the simple first order Euler discretization, which can be written as 620

$$x(k+1)=x(k)+h \cdot F(k,x(k)),$$

Where h>0 is the discretization time-step, and k=0, 1, 2, ..., is the discretization index. Here, F can be any of the optimization ODEs/ODIs presented above.

In another embodiment, we propose a higher order discretization method, for example Runge-Kutta.

Any other discretization of ODEs or ODIs can be used in the context of this invention, to solve the optimization ODEs or ODIs.

Extension to Constrained Optimization

In some cases, the optimization variable x needs to remain within a certain desired bound. In such cases, the optimization problem is said to be a constrained problem, and can be written as follows:

$$\begin{aligned}
&\underset{x \in \mathbb{R}^n}{\text{minimize}} && f(x) \\
&\text{subject to} && h_j(x) \geq 0, \quad j=1, \ldots, p \\
&&& g_i(x) = 0, \quad i=1, \ldots, e,
\end{aligned}$$

With $f, h_1, \ldots h_p, g_1, \ldots, g_e : \mathbb{R}^n \to \mathbb{R}$.

Figure 7:
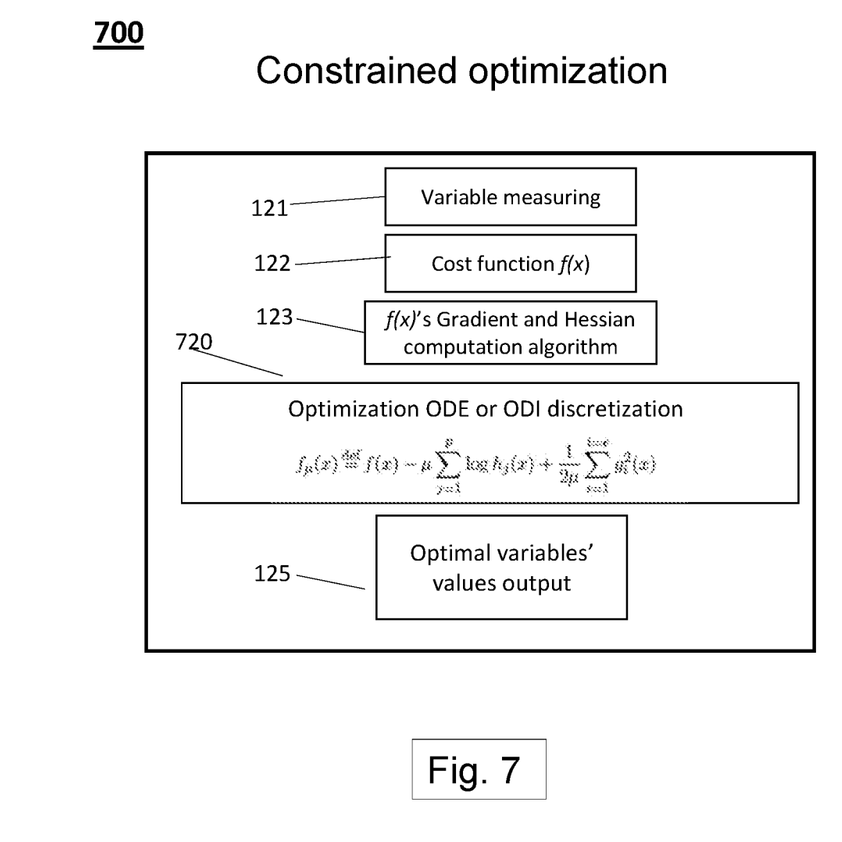
FIG. 7 is a schematic diagram illustrating a system for optimizing a constrained cost function according to embodiments of the present invention.

In this case, we can write this constrained optimization problem as the following unconstrained optimization problem 720

$$f_\mu(x) \stackrel{def}{=} f(x) - \mu \sum_{j=1}^{p} \log h_j(x) + \frac{1}{2\mu} \sum_{i=1}^{i=e} g_i^2(x)$$

Where μ>0, is a penalty parameter. We then obtain the optimal vector $x^a$ for the new cost function $f_\mu(x)$ in finite time using one of the proposed ODEs or ODIs, and this optimal vector $x^a$ is also an optimal vector for the original constrained optimization problem, for a proper choice of the coefficient μ>0.

Some Numerical Experiments:

We will now test one of our proposed ODEs on the Rosenbrock function $f: R^2 \to R$, given by $$f(x_1, x_2) = (a-x_1)^2 + b(x_2 - x_1^2)^2, \quad (6)$$

with parameters a,b∈R. This function is nonlinear and non-convex, but smooth. It possesses exactly one stationary point $(x_1^a, x_2^a) = (a, a^2)$ for b≥0, which is a strict global minimum for b>0. If b<0, then $(x_1^a, x_2^a)$ is a saddle point. Finally, if b=0, then $\{(a, x_2): x_2 \in R\}$ are the stationary points of $f$, and they are all non-strict global minima.

We choose to minimize this cost function in finite time, using the optimization ODE $$\dot{x} = -c \|\nabla f(x)\|^p \frac{[\nabla^2 f(x)]^T \nabla f(x)}{\nabla f(x)^T [\nabla^2 f(x)]^{r+1} \nabla f(x)}$$

With the constants: p=1, r=-1, c=$\|\nabla f(x0)\|$, which implies that we want to obtain the optimal vector at t*=1 sec.

Figure 8:
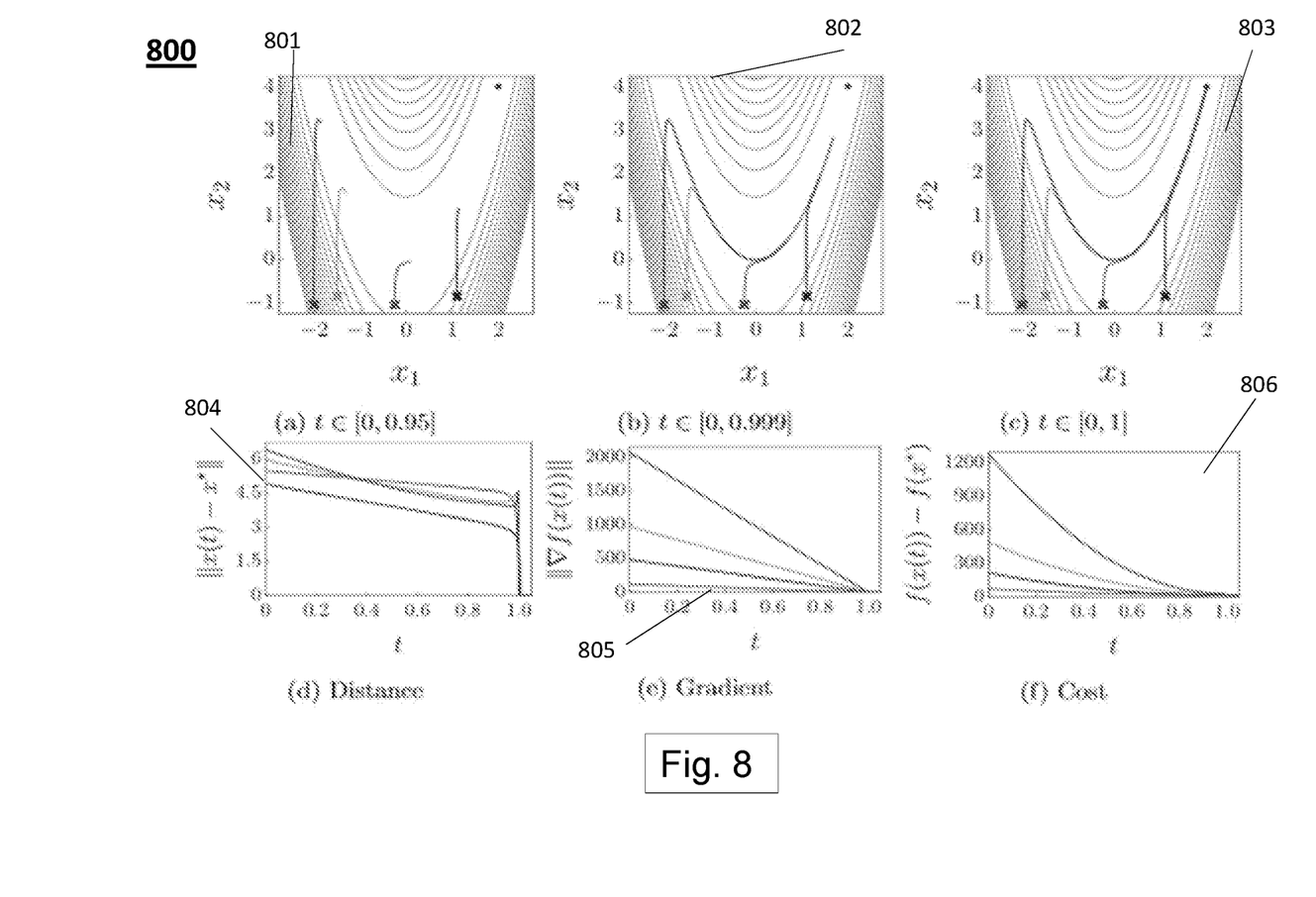
FIG. 8 is a schematic diagram illustrating the finite-time convergence of the proposed algorithms on a static optimization testcase, from different initial conditions.

The trajectories over time of the solutions of the optimization ODE for different initial conditions 800 show convergence to the same minimum point $x^å=(a,a^2)=(2,4)$. We see that the trajectories from four different initial conditions reach four different intermediate points at the intermediate times 0.95 sec 801, 0.909 sec 202, but finally all reach the same optimal point at 1 sec 803. We can also see that from all four initial conditions the norm of the error vector $x-x^å$ reaches zero at exactly $t^*=1$ sec, 804, and the same for the norm of the gradient vector or the cost function $f(x)$ 805, and the norm of the error vector between the cost function and the optimal value of the cost $f(x)-f(x^å)$ 806.

We also show the case of a time varying cost function $$f(t, x) \triangleq (x - x^*(t))^2,$$

$$x^*(t) \triangleq 10\sin\left(\frac{4t}{1 + 0.1t^2}\right)$$

We solve the optimization ODE $$\dot{x} = -w(t, x; x_0)\frac{[\nabla^2 f(t, x)]^T \nabla f(t, x)}{\nabla f(t, x)^T [\nabla^2 f(t, x)]^{r+1} \nabla f(t, x)},$$

$$w(t, x; x_0) \triangleq \frac{\|\nabla f(0, x_0)\|^{2(1-\alpha)}}{2(1-\alpha)T}\|\nabla f(t, x)\|^{2\alpha} + \nabla f(t, x)^T \frac{\partial \nabla f}{\partial t}(t, x)$$

With the coefficients $(\alpha, r)=(½,-1)$

Figure 9:
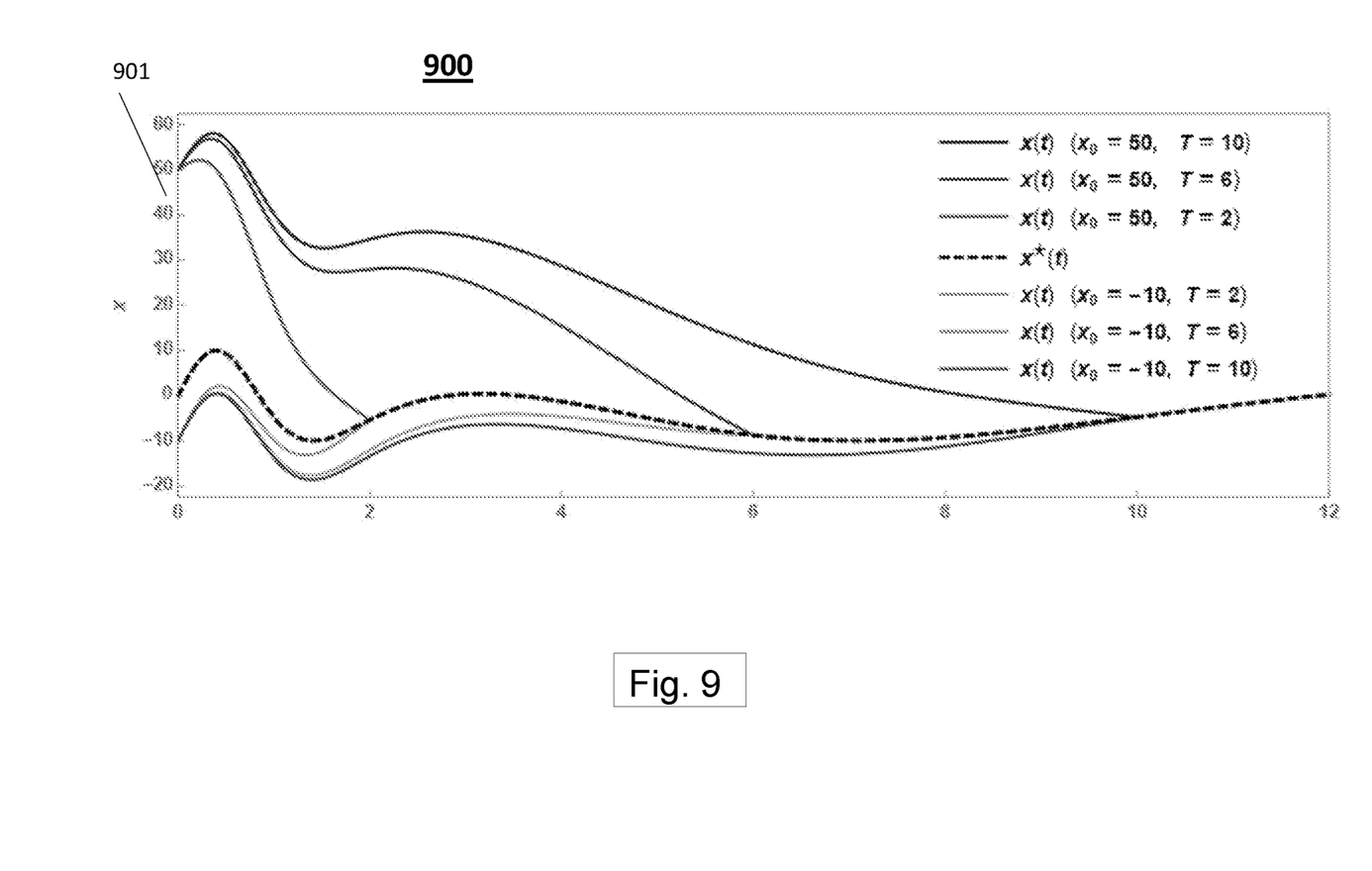
FIG. 9 is a schematic diagram illustrating the finite-time convergence of the proposed algorithms on a time-varying optimization testcase, from different initial conditions.

The trajectories of the solution of the optimization ODE 901 for different initial conditions, show that they all converge to the optimal trajectory at the exact desired convergence time T.

Zero Order Optimization ODE or ODI Using Gradient and Hessian Estimates

In some cases there is no direct access to a closed form expression of the cost function $f(x)$, in such cases we propose to compute the gradient and the Hessian of the cost function is several ways 123.

Figure 10:
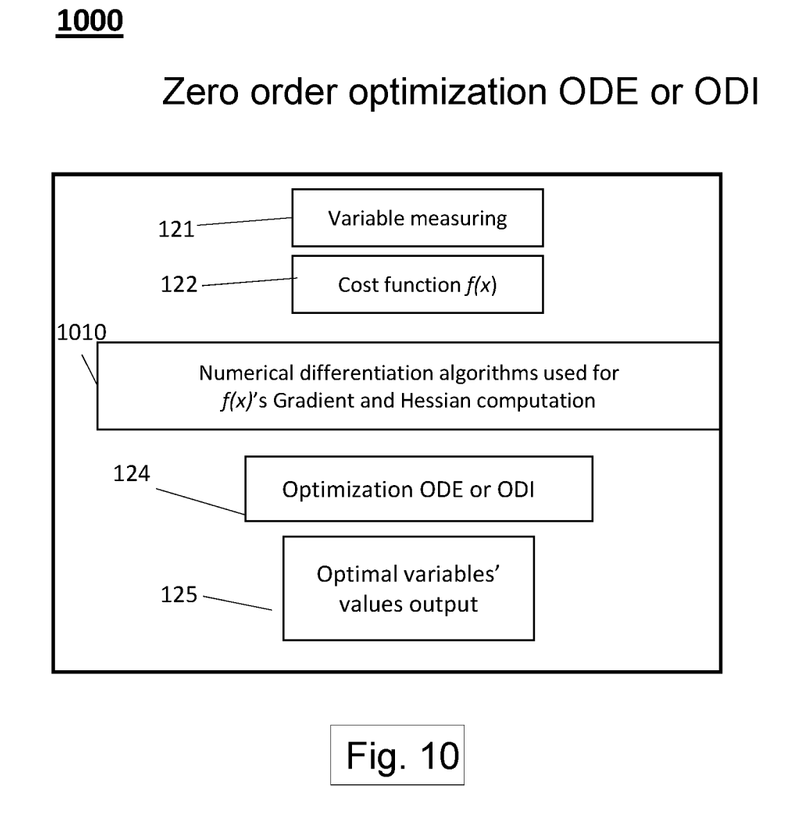
FIG. 10 is a schematic diagram illustrating a system for optimizing a cost function according to embodiments of the present invention, using numerical differentiation.

In one embodiment, numerical differentiation algorithms 1010 may be stored in the memory 120 to compute the first order derivative of the cost function also known as gradient $\nabla f(x)$ by direct numerical differentiation as 1010

$$\nabla f(x) = \frac{f(x + \text{delta}_x) - f(x)}{\text{delta}\_x},$$

Where delta_x>0 is a differentiation step.

In the same way, we propose the compute the Hessian of the cost function or second order derivative of the cost function using simple numerical differentiation as 1010

$$\nabla^2 f(x) = \frac{\nabla f(x + \text{delta}_x) - \nabla f(x)}{\text{delta}\_x}.$$

Figure 11:
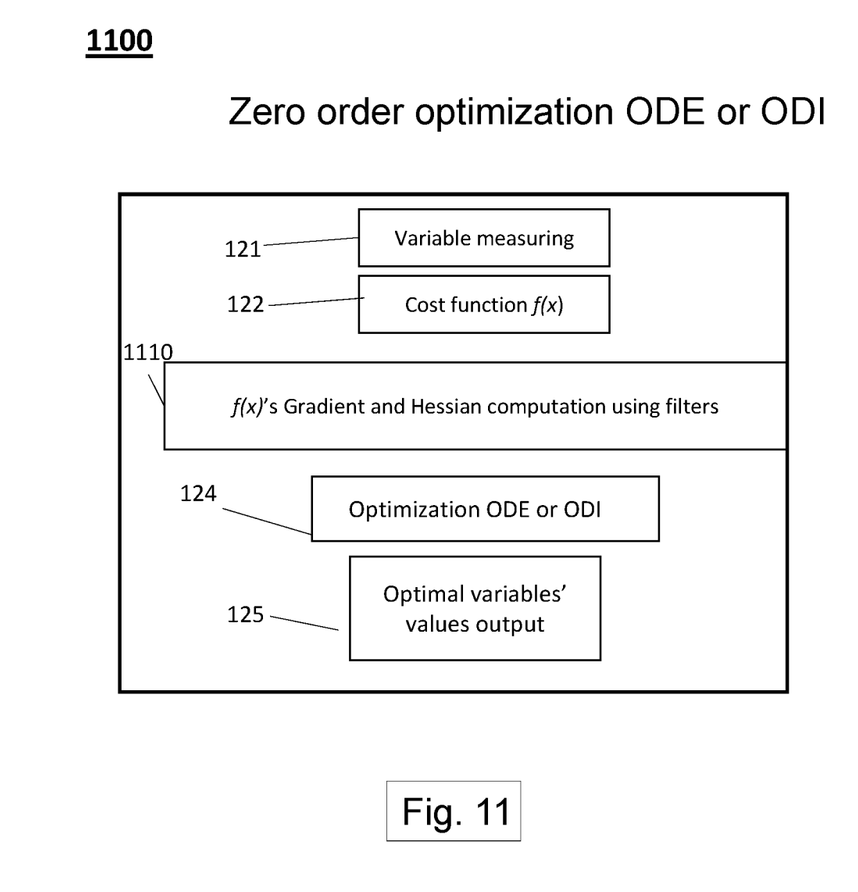
FIG. 11 is a schematic diagram illustrating a system for optimizing a cost function according to embodiments of the present invention, using filters.

Yet another embodiment we propose to compute these derivatives using some filters as 1110

$$\nabla f(x) = G_{grad} * f(x),$$

Where $G_{grad}$ represents the gradient computation filter, and * denotes a convolution operator.

We then propose to compute the Hessian using a Hessian filter as 1110

$$\nabla^2 f(x) = G_{Hessian} * \nabla f(x),$$

Where $G_{Hessian}$ represents the Hessian computation filter, and * denotes a convolution operator.

Figure 12:
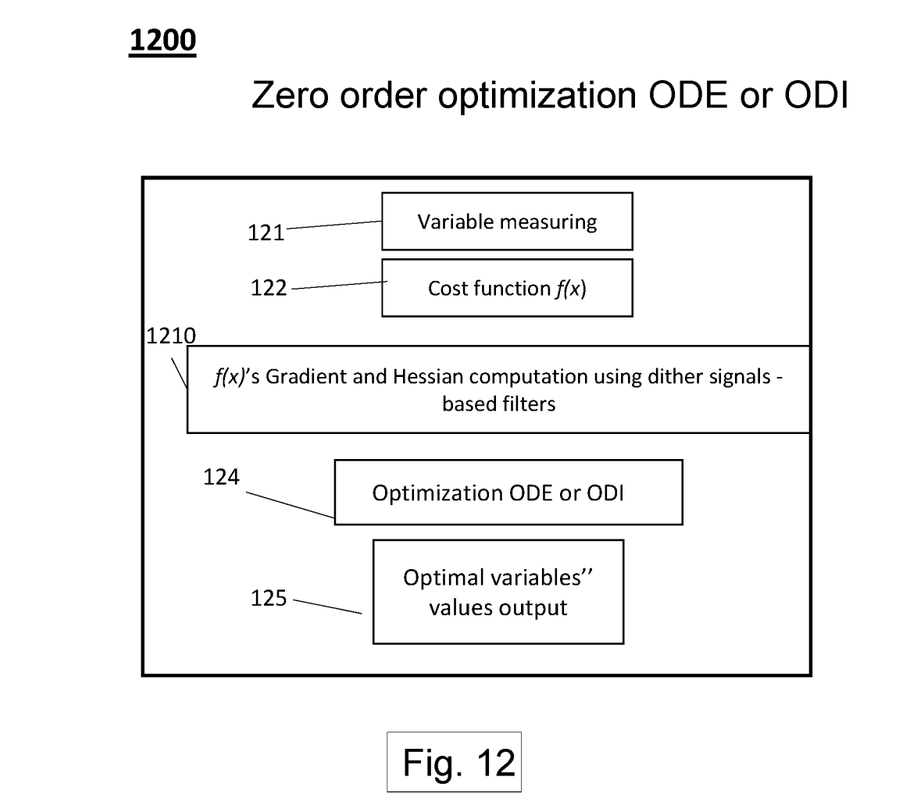
FIG. 12 is a schematic diagram illustrating a system for optimizing a cost function according to embodiments of the present invention, using dither signals.

In some embodiments, we propose to use dither signals-based gradient and Hessian filters 1210. For example, we propose to use trigonometric functions, e.g., sine and cosine functions, to design such filters.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A robotic controller for controlling a robotic arm of a robot comprising:
   a manipulator interface configured to receive measurement signals from sensors arranged for the robotic arm and output control signals to manipulators of the robot arm, wherein the measurement signals represent arm articulation angles of the robotic arm and positions of a robotic arm end effector;
   a memory to store computer-executable algorithms including variable measuring algorithm, cost function equations, ordinary differential equation (ODE) and ordinary differential inclusion (ODI) solving algorithms and Optimal variables' values output algorithm;
   a manipulator controller processor, in connection with the memory, configured to:
   generate a vector of measuring variables from the measurement signals received via the manipulator interface;
   generate a cost function equation based on the measurement signals with respect to the robotic controller, based on the vector variables using weighting factors, wherein the vector variables are represented by a time-step;
   compute first-derivative of the cost function equation at an initial time-step;
   determine a convergence time from the first-derivative of the cost function equation;
   compute second derivative of the cost function equation and generating an optimization differential equation based on the first and second derivatives of the cost function equation; obtain, starting with the initial time-step, a value of the optimization differential equation or differential inclusion by solving the optimization differential equation or the differential inclusion, in an iteration manner, with a predetermined time step being multiplied with the value of the solved differential equation to obtain next vector variables corresponding to a next iteration time-step, until the time-step reaches the convergence time;

generate the control signals by computing optimal values of the vector of variables and the cost function equation; and transmit the control signals to the manipulators via the manipulator interface.

2. The controller of claim 1, wherein the optimization differential equation is solved by a first order Euler steps:

$$x(k+1)=x(k)+h, F(k,x(k)),$$

where h>0 is the discretization time-step, and k=0, 1, 2, ..., is the discretization index, here, F is the optimization differential equation or differential inclusion.

3. The controller of claim 1, wherein the optimization differential equation is solved by the Runge-Kutta discretization steps.

4. The controller of claim 1, wherein the optimization differential equation is solved by a discretization steps.

5. The controller of claim 1, wherein the optimization differential equation is $$\dot{x} = -c\|\nabla f(x)\|^p \frac{[\nabla^2 f(x)]^r \nabla f(x)}{\nabla f(x)^T [\nabla^2 f(x)]^{r+1} \nabla f(x)},$$

where the constant coefficient c,p,r, are such that c>0, p∈{1,2}, and r∈R, and $f$ represents the cost function, $\nabla f(x)$ represents the gradient of the cost function, and $\nabla^2 f(x)$ the Hessian of the cost function.

6. The robotic controller of claim 1, wherein the cost function equation is written as $$f(x)=(\text{effector}_x(\theta)-x^*)^2+(\text{effector}_y(\theta)-y^*)^2+(V\text{effector}_x(\dot{\theta})-Vx^*)^2+(V\text{effector}_y(\dot{\theta})-Vy^*)^2,$$

wherein x is defined as $x=(\theta,\dot{\theta})^T$, wherein $\theta \in R^n$ represents the vector of the robot manipulator arm articulation angles, wherein $\dot{\theta} \in R^n$ represents the vector of the robot manipulator arm articulation angular velocities.

7. A Heating, Ventilation, and Air Conditioning (HVAC) actuator controller for controlling actuators of an HVAC system comprising:

an HVAC actuator interface configured to receive measurement signals from temperature sensors and air flow velocity sensors arranged for the HVAC system and output actuator control signals to the actuators of the HVAC system;

a memory to store computer-executable algorithms including variable measuring algorithm, cost function equations, ordinary differential equation (ODE) and ordinary differential inclusion (ODI) solving algorithms and Optimal variables' values output algorithm;

an HVAC processor, in connection with the memory, configured to perform steps of generate a vector of measuring variables from the measurement signals received via the HVAC actuator interface;

generating a cost function equation based on room temperature and air flow velocity, with respect to the HVAC actuator controller, based on the vector variables using weighting factors, wherein the vector variables are represented by a time-step;

computing first-derivative of the cost function equation at an initial time-step;

determining a convergence time from the first-derivative of the cost function equation;

computing second derivative of the cost function equation and generating an optimization differential equation based on the first and second derivatives of the cost function equation;

computing, starting with the initial time-step, a value of the optimization differential equation or differential inclusion by solving the optimization differential equation or the differential inclusion, in an iteration manner, with a predetermined time step being multiplied with the value of the solved differential equation to obtain next vector variables corresponding to a next iteration time-step, until the time-step reaches the convergence time; and generating the actuator control signals based on optimal values of the vector of variables and the cost function equation.

* * * * *